US007884964B2

(12) United States Patent
Maltz et al.

(10) Patent No.: US 7,884,964 B2
(45) Date of Patent: Feb. 8, 2011

(54) METHODS AND SYSTEMS FOR CONTROLLING OUT-OF-GAMUT MEMORY AND INDEX COLORS

(75) Inventors: Martin S. Maltz, Rochester, NY (US); Raja Bala, Webster, NY (US); Lalit K. Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1491 days.

(21) Appl. No.: 10/635,381

(22) Filed: Aug. 5, 2003

(65) Prior Publication Data

US 2005/0030560 A1 Feb. 10, 2005

(51) Int. Cl.
*G06F 15/00* (2006.01)
*G06K 9/00* (2006.01)

(52) U.S. Cl. ........................ 358/1.9; 358/518; 358/519; 358/515; 358/516; 358/521; 358/525; 358/530; 358/448; 358/254; 358/1.13; 382/162; 382/164; 382/167; 382/254; 382/232; 345/590; 345/591; 345/549; 345/593; 345/690

(58) Field of Classification Search .................. 358/1.9, 358/518, 515, 517–520, 516, 527, 2.1, 3.06, 358/501, 507, 3.23, 3.28, 534, 3.01, 1.1, 358/1.18, 504, 512, 521, 525, 531, 530, 448, 358/500; 382/162, 163, 167, 255, 286, 165, 382/258, 164, 254, 232, 229, 112, 141; 345/604, 345/590, 591, 596, 419, 549, 88, 593, 690; 347/15, 24, 43, 115, 172, 178, 232
See application file for complete search history.

(56) References Cited

U.S. PATENT DOCUMENTS 5,704,026 A 12/1997 Wan ........................ 395/131

| 5,832,109 | A  | * | 11/1998 | Mahy ................... 382/162 |
| 5,872,898 | A  |   | 2/1999  | Mahy |
| 6,229,916 | B1 | * | 5/2001  | Ohkubo ................ 382/167 |
| 6,236,474 | B1 | * | 5/2001  | Mestha et al. .......... 358/520 |
| 6,335,983 | B1 |   | 1/2002  | McCarthy et al. ....... 382/162 |

(Continued)

OTHER PUBLICATIONS

Inui, M., "Fast Algorithm for Computing Color Gamuts," *Color Research and Application* (1993) October, 18(5):341-348.

(Continued)

*Primary Examiner*—Edward L Coles
*Assistant Examiner*—Steven Kau
(74) *Attorney, Agent, or Firm*—Kermit D. Lopez; Luis M. Ortiz; Ortiz & Lopez, PLLC (57) ABSTRACT

Methods and systems in an image processing device for controlling colors that are located external to a gamut are disclosed. A plurality of color values can be automatically provided as input to said image processing device, wherein said image processing device is under a control of a particular dimensional order, typically a three-dimensional order, but alternatively can be a two-dimensional order. Next, an operation can be performed dynamically determining which color value among the plurality of color values has attained a gamut limit. Thereafter, the particular dimensional order can be automatically reduced, thereby providing improved control for colors that are located external to said gamut. The plurality of color values analyzed is generally associated with three colors—cyan, magenta, and yellow.

22 Claims, 5 Drawing Sheets

U.S. PATENT DOCUMENTS

| | | | |
|---|---|---|---|
| 6,342,951 B1 | 1/2002 | Eschbach et al. | 358/1.9 |
| 6,400,843 B1 | 6/2002 | Shu et al. | 382/167 |
| 6,437,792 B1 * | 8/2002 | Ito et al. | 345/600 |
| 6,560,356 B1 | 5/2003 | Takahashi et al. | 382/162 |
| 6,567,170 B2 | 5/2003 | Tandon et al. | 356/406 |
| 6,618,499 B1 | 9/2003 | Kohler et al. | |
| 6,750,992 B1 * | 6/2004 | Holub | 358/504 |
| 7,167,277 B2 * | 1/2007 | Shimizu et al. | 358/1.9 |
| 2004/0096104 A1 * | 5/2004 | Terekhov | 382/167 |

OTHER PUBLICATIONS

Morovic, J. et al., "The Fundamentals of Gamut Mapping: A Survey," *Journal of Imaging Science and Technology* (2001) 45(3):283-290.

European Partial Search Report for EP Application 04018583.7 dated Oct. 30, 2009.

* cited by examiner

METHODS AND SYSTEMS FOR CONTROLLING OUT-OF-GAMUT MEMORY AND INDEX COLORS

TECHNICAL FIELD

Embodiments generally relate to color rendering devices, such as printers and photocopy machines. Embodiments also relate to color rendering control and feedback methods and systems. Embodiments additionally relate to color adjustment methods and systems. Embodiments also relate to color sensors.

BACKGROUND OF THE INVENTION

In many instances it can be necessary to produce faster, higher quality and more sophisticated rendering devices such as (e.g., printers, copiers, and the like). Additionally, customers demand the ability to reproduce their desired input images to achieve accurate output that does not vary over time (e.g., between pages or when output again at a later time) or among various rendering devices (e.g., among various printers on a network, between home and office marking devices, etc.). These considerations are more difficult to achieve with color rendering devices because of the greater number of variables involved and the sensitivity of these devices to environmental conditions, and also to issues concerning out-of-gamut colors.

In general, a gamut can be defined as the range of color that a rendering device (e.g., printer, copier, and the like) can produce, or the range of color that a color model can represent. In the color digital image processing arts, the space of colors that a printer (or other rendering device) is capable of reproducing is referred to as the "gamut" of the printer. Very often, colors specified in a digital image cannot be reproduced by a particular printer when it comes time to output the color digital image to the printer for purposes of rendering a hard copy printed output of the digital image.

The printer gamut (also referred to herein as the output gamut) is often limited when compared to the gamut of the source digital image (the input gamut) due to physical limitations of the printer's colorants. Colors in the input gamut but not in the output gamut are said to be "out-of-gamut" and must be accounted for before the digital image may be printed—i.e., areas in the output document where these colors are to be found may not simply be left blank in the final printed document.

Prior techniques for dealing with out-of-gamut colors include gamut clipping and gamut compression. In gamut clipping, all out-of-gamut colors are mapped to a color on the gamut "surface" while in-gamut colors are left unaltered. A common form of clipping involves a ray-based approach, wherein a ray is drawn from a desired out-of-gamut color to a point on a neutral axis. The location or point where the ray penetrates the gamut surface is the gamut-mapped color. Such a strategy preserves hue through the gamut-mapping operation. In gamut compression, both in-gamut and out-of-gamut colors are altered to map the entire range of image colors to the printer gamut. In practical systems, the gamut-mapping operation is often incorporated into a 3-dimensional lookup table for efficient computational processing.

A common problem in color printing is the stable rendition of colors over time. In particular, it is desirable when a color is situated near or on the boundary of a color gamut, to stabilize the resulting color rendering. Prior techniques for ensuring stable color control involve iterative closed-loop algorithms that apply a corrective feedback on 3-dimensional color signals. Such techniques can give rise to unstable or erroneous control for colors that are out-of-gamut, or on the gamut-surface.

Accordingly, it has been deemed desirable to provide a color rendering technique that overcomes the inability of traditional print engines and color rendering devices to control the printed color, particularly out-of-gamut colors given a particular gamut-mapping algorithm.

BRIEF SUMMARY

It is a feature of the present invention to provide improved color rendering methods and systems.

It is another feature of the present invention to provide improved control for out-of-gamut and index colors associated with color rendering devices and systems.

Aspects of the present invention related to methods and systems for controlling colors in an image processing device that are located external to a gamut are disclosed. A plurality of color values can be automatically provided as input to said image processing device, wherein said image processing device is under a control of a particular dimensional order, typically a three-dimensional order, but alternatively can be a two-dimensional order. Next, an operation can be performed dynamically determining which color value among the plurality of color values has attained a gamut limit. Thereafter, the particular dimensional order can be automatically reduced from, for example, a three-dimensional order to a two-dimensional or one-dimensional order based on determining which color value among said plurality of color values has attained said gamut limit, thereby providing improved control for colors that are located external to said gamut.

The plurality of color values analyzed using the present invention is generally associated with three colors—cyan, magenta, and yellow. Dynamic selection of appropriate dimensions, along with compensation/transformation inside an iterative controller results in improved out-of-gamut color control and ultimately, a more efficient and cleaner color rendering.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
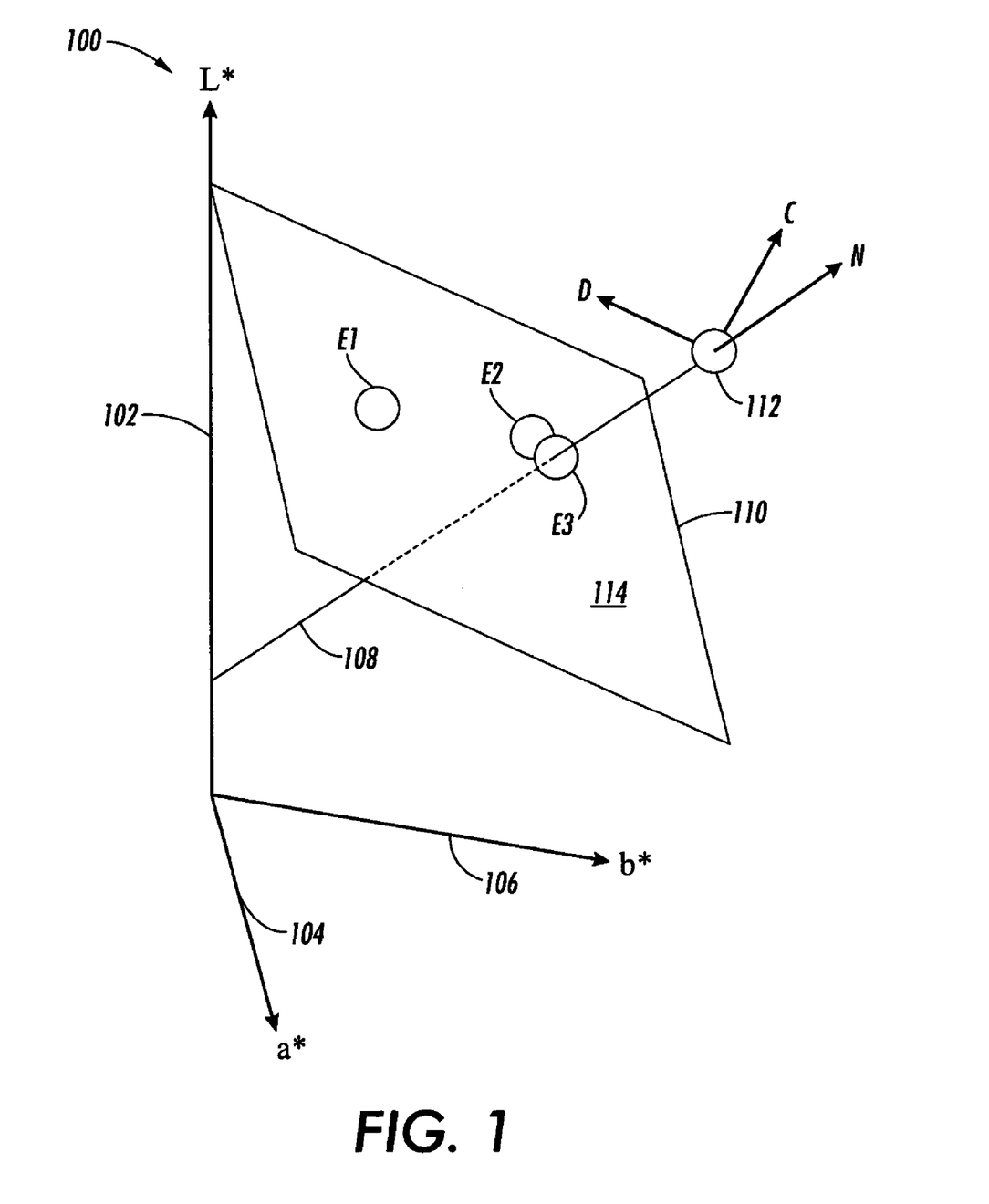
FIG. 1 illustrates a schematic projection of out-of-gamut memory color in orthogonal NCD coordinate space in accordance with an embodiment of the present invention.

FIG. 1 illustrates a schematic projection 100 of an out-of-gamut memory color in orthogonal NCD coordinate space in accordance with an embodiment of the present invention. Projection 100 includes three vectors or axes 102, 104, and 106 which are also respectively labeled as vectors L*, a*, and b*. Also depicted in FIG. 1 is a gamut 114, which includes a red face 110 thereof. Gamut 114 is located generally between axes 102, 104 and 106. A ray 108 extends generally from axis 102 and through the red face 114 of the gamut. Located on the surface of gamut 114 are colors E1, E2, and E3. A color 112 is located external to the red face 110 of gamut 114. Color 112 is also generally associated with directional axes D, C, and N.

In general, an iterative print and measure method can be implemented which determines an appropriate CMY combination for producing a specified L*a*b* (i.e., axes 102, 104 and 106). In the case of a four color printer, for example, the CMY can be processed by a suitable GCR/UCR strategy to obtain a corresponding CMYK. Ink limiting operations may also be performed. Such an iterative technique can, however, run into problems at the gamut surfaces, because the next trial CMY might be located outside the gamut of the printer.

Note that in general, the acronym "CMY" refers to cyan, magenta, and yellow, which are considered the subtractive primary colors, or a color space that describes colors in terms of their cyan, magenta, and yellow components. The subtractive primary colors of cyan, magenta and yellow are generally utilized to create reflective color. Cyan absorbs (i.e., subtracts) all red light, reflecting blue and green. Magenta, on the other hand, absorbs all green light, reflecting blue and red. Yellow absorbs blue light, reflecting red and green.

Because at the surface of the gamut, one of the three colorant coordinates (C, M, or Y) is fixed, the aforementioned three-dimensional problem can be converted into a two-dimensional problem. Consider, for example, the case of an out of gamut red. Producing such a color would require a negative amount of cyan. Because achieving a negative amount of cyan is physically impossible, such a color is out of reach of the printer's gamut. To obtain the gamut mapped color, it is necessary to set C=0, and vary M and Y to obtain the "best" gamut mapped red.

There are several possible strategies for gamut mapping. Ray-based methods represent one possible gamut mapping strategy. In ray-based approaches, a ray can be drawn from a desired color to a point on a neutral axis, which results in the preservation of hue. The location or point where the ray penetrates the gamut surface is therefore the desired color.

To obtain the CMY combination that produces this color, it is necessary to set C=0 and vary M and Y to get the desired color. This color can be found by utilizing an NCD coordinate system, where N is a vector coincident with the desired ray, and C and D are two orthogonal unit vectors at right angles to N. A suitable transformation of the form L*a*b*=M*NCD+V can always be determined in order to transform between NCD and L*a*b* vectors, where M is a 3×3 matrix, and V is a vector. The inverse of this transform can also be found. This transformation can be designated by a symbol, T. In the NCD coordinate system, the desired color results where the C and D component of the NCD vector is equivalent to zero.

Next, a two-dimensional Jacobian matrix can be determined, which describes the printer response in terms of the derivatives of the C and D components of the NCD vector with respect to M and Y at the point where the ray penetrates the surface of the gamut. An initial estimate for the M and Y can also be obtained to produce the desired color. Such estimates can be performed utilizing a variety of techniques. For example, a convenient estimation technique involves the use of an approximate printer model. Because such a model is only an approximate model, printing an initial CMY combination generally produces a color (e.g., E1) that does not lie at the desired point on the surface of the printer gamut.

Utilizing the two-dimensional Jacobian matrix, a gain matrix can be found which is utilized to calculate an improved estimate of M and Y, given the values of the C and D components of the NCD vector for the printed patch. Then, utilizing an iterative print and measure process (e.g., E2 and E3), values of M and Y can be determined, which make the C and D components of the NCD vector equal to zero. This is the desired color.

Another gamut mapping approach involves searching for the color on the surface of the gamut that is nearest to the specified color. This case is usually handled as discussed above, except that the ray (e.g., ray 108) and N vector are selected to be perpendicular to the gamut surface. If the gamut mapped color lies on a gamut edge or vertex, however, a modified approach is used. If the gamut mapped color lies on a gamut vertex, all the CMY components are known, and nothing further need be done. If it lies on an edge of the gamut, the problem becomes one dimensional. In this case, the ray and N vector go from the edge to the specified color, and are perpendicular to the edge. The C unit vector can be located parallel to the edge. Only one colorant is varied, such that the derivative required be evaluated is the derivative of the C component of the NCD vector with respect to the colorant being varied.

Still, a further gamut mapping technique involves searching for the color on the surface of the gamut which is nearest to the specified color, but is constrained to be of the same hue. This case can be handled similar to the previously discussed cases, except that the ray and N vector would lie in a plane of the desired hue, and would be located perpendicular to the contour formed by the intersection between this plane and the gamut surface.

The aforementioned embodiments all involve a dedicated gamut mapping function that determines the surface point, as well as the axes of the NCD coordinate system. In some applications, it may not be feasible or convenient to invoke such a function. In an alternative embodiment, a standard International Color Consortium (ICC) framework can be utilized to realize an embodiment of the present invention. A specified input color can be mapped through a BtoA tag in one of the rendering intents (e.g., preferably a calorimetric intent) of the ICC profile to obtain an initial CMY estimate.

Mapping the CMY point through the AtoB tag produces a corresponding color on the gamut surface in L*a*b* space. Only the NCD axes remain to be determined. Ideally such axes would be calculated for every new input point. In practice, however, it is probably sufficient to store one set of axes for each gamut face and edge. These can be computed and stored a priori in a private ICC tag using information from gamuts that are representative of the device under consideration.

If the specified color is well within the gamut, a standard 3-D control approach can be applied. For example, a 3×3 gain matrix can be derived to iteratively estimate the CMY combination that produces the desired L*a*b* color.

As the desired color approaches the gamut boundary, a proper transition should be ensured from the 3D strategy to the 2-D (or 1-D) strategy described herein with respect to embodiments.

One approach would be to apply a linear interpolation between the outputs of the 3-D and 2-D iterations, where the interpolation weight depends on the distance to the gamut surface. The latter can be estimated by examining the minimum and maximum values of the initial CMY estimate, and their deviation from 0 and 100% area coverage, respectively. Alternatively, the distance to the gamut surface in L*a*b* can be utilized. A measure of the stability of the 3-D iterative algorithm could also be utilized as an indicator of how close the point is to the gamut surface.

Figure 2:
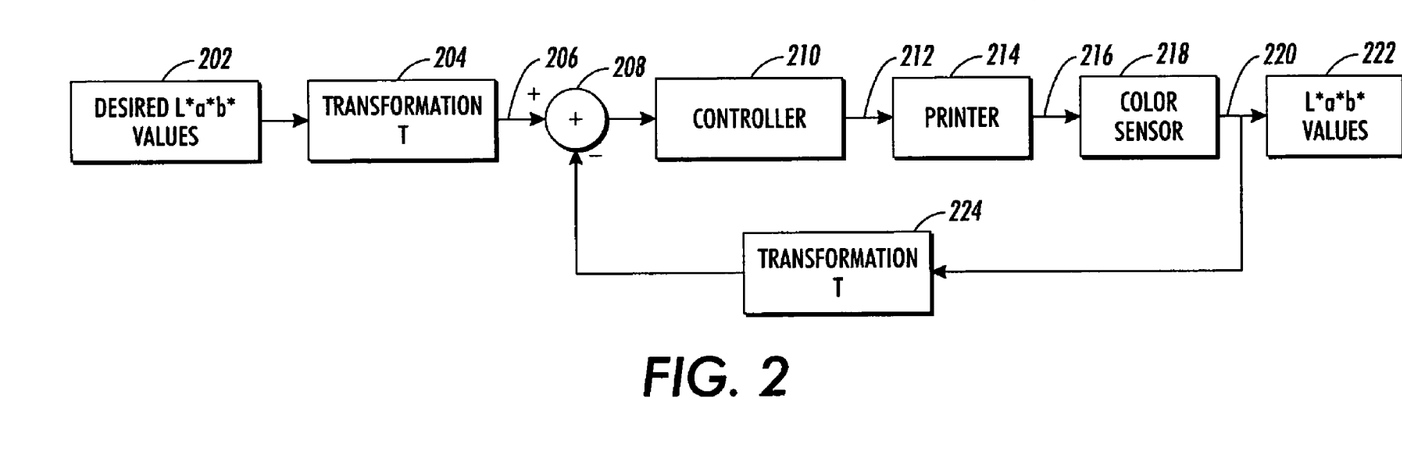
FIG. 2 illustrates a block diagram illustrating a method for controlling gamut memory colors in accordance with an embodiment of the present invention.

FIG. 2 illustrates a block diagram illustrating a system 200 for controlling gamut memory colors in accordance with an embodiment of the present invention. In FIG. 2, system 200 utilizes an iterative control loop with appropriate transformations to a reference and measured memory colors so that the error between the measured colors and the transformed memory colors is minimal. When the errors are minimal, the CMY values as shown in FIG. 2 become the desired values that are utilized for achieving consistency in memory colors. These CMY values can be later embedded inside an image before actually printing the image at the pixel locations determined by a user interface and/or appropriate application software.

System 200 includes a transformation module 204 (i.e., T) which receives input in the form of desired L*a*b* values of memory color, as indicated at block 202. Output 206 from transformation module 204 is generally in the form of desired NCD values of the memory color, which in turn are input to an adder 208. Output from adder 208 is input to an iterative controller 210 whose output 212 reflects compensated CMY values that require correction for printer/media variations.

Output 212 is generally provided to a printer 214 or another graphical or textual rendering device (e.g., a photocopy machine). Output 216 is then generated by printer 214 in the form of patches, which are provided as input to a color sensor 218. Output 220 from color sensor 218 can then generate L* a* b* values of measured patches, as indicated by block 220. Output 220 can then be provided as input to a transformation module 224 (i.e., also T) whose output provides measured NCD values of the memory color. Output from transformation module 224 is then fed as input to adder 208, thereby completing a feedback control loop. Note that system 200 can be utilized not only with online sensors (e.g., color sensor 218), but may also be utilized with offline sensors. utilized with offline sensors.

Transformation modules 204 and 224 generally implement a transformation function, T. An example of a transformation function, T, can be illustrated as follows: Consider a very bright red, where L*a*b*=[100, 50, 50], gamut mapped along a ray that goes to L*a*b*=[50, 0, 0]. For this case, the following matrices M and V can be designated via equations (1) and (2) below:

$$M = \begin{bmatrix} 1 & 0 & 2 \\ 1 & -1 & -1 \\ 1 & 1 & -1 \end{bmatrix} \quad (1)$$

Wherein:

N goes from L*a*b*=[50,0,0] to L*a*b*=[100,50,50] so delta L*a*b*=[1,1,1]

C is at right angles in a plane of constant L* so delta L*a*b*=[0,-1,1]

D is N X C, so is [2,-1,-1] (X is the vector cross product)

$$V = \begin{bmatrix} 50 \\ 0 \\ 0 \end{bmatrix} \quad (2)$$

Variables N, C, and D are governed by a number of parameters. For example, in this transformation example, N extends from L*a*b*=[50,0,0] to L*a*b*=[100,50,50] so that deltaL*a*b* is proportional to [1,1,1]. C is located at right angles in a plane of constant L* so that deltaL*a*b*=[0,-1,1]. Finally, D is N X C, which becomes [2,-1,-1] (i.e., X is the vector cross product).

Refer also to N, C, and D of FIG. 1, which are associated with color 112 depicted in FIG. 1. The corresponding inverse transformation, T, can be determined utilizing equations (3) and (4) as shown below, where T=M$^{-1}$ is a transformation matrix, which can be utilized through out system 200 and its corresponding feedback control loop:

$$\begin{bmatrix} N \\ C \\ D \end{bmatrix} = \begin{bmatrix} 1/3 & 1/3 & 1/3 \\ 0 & -1/2 & 1/2 \\ 1/3 & -1/6 & -1/6 \end{bmatrix} \begin{bmatrix} L^* - 50 \\ a^* \\ b^* \end{bmatrix} \quad (3)$$

$$= \begin{bmatrix} 1/3 & 1/3 & 1/3 \\ 0 & -1/2 & 1/2 \\ 1/3 & -1/6 & -1/6 \end{bmatrix} \begin{bmatrix} 100 - 50 \\ 50 \\ 50 \end{bmatrix}$$

$$= \begin{bmatrix} 50 \\ 0 \\ 0 \end{bmatrix}$$

$$\begin{bmatrix} N \\ C \\ D \end{bmatrix} = T \begin{bmatrix} L^* - 50 \\ a^* \\ b^* \end{bmatrix} \quad (4)$$

Figure 3:
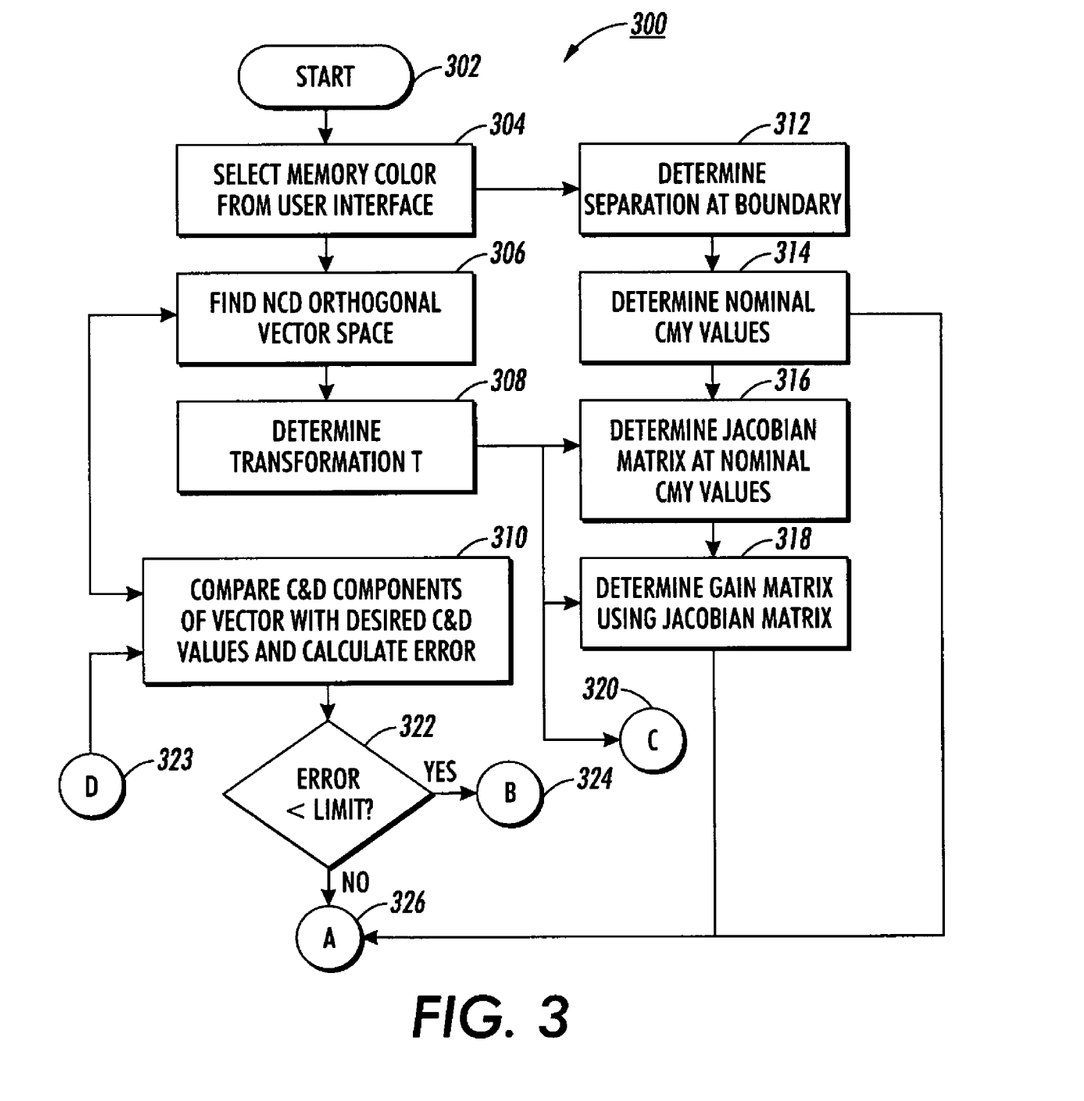
FIG. 3 illustrates a flow chart depicting logical operational steps, which can be implemented in accordance with an embodiment of the present invention.
Figure 4:
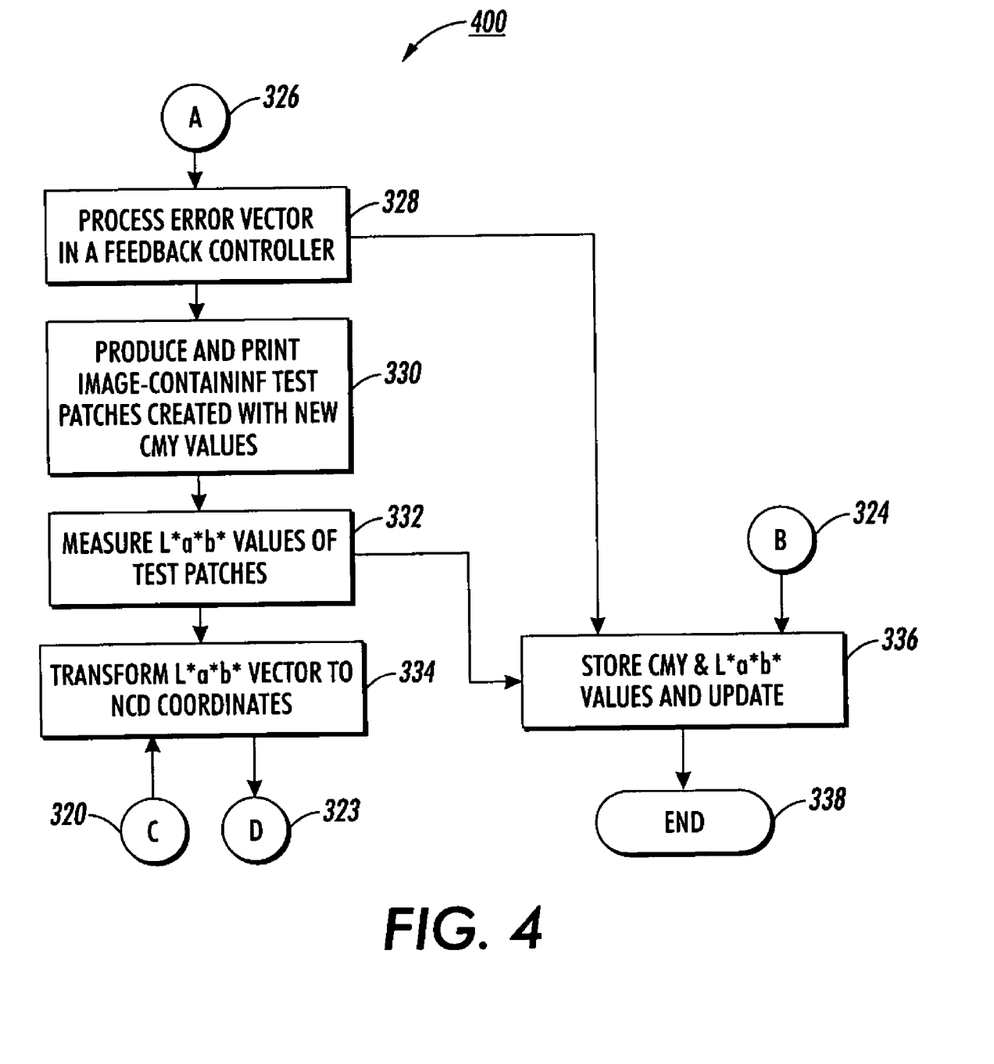
FIG. 4 illustrates a flow chart depicting a continuation of the logical operation steps depicted in FIG. 3, in accordance with an embodiment of the present invention.

FIG. 3 illustrates a flow chart 300 depicting logical operational steps, which can be implemented in accordance with an embodiment of the present invention. FIG. 4 illustrates a flow chart 400 depicting a continuation of the logical operation steps depicted in FIG. 3, in accordance with an embodiment of the present invention. Note that FIGS. 3-4 essentially represent a single flow chart. In FIGS. 3-4, analogous or similar parts are indicated generally by identical reference numerals.

The process depicted in FIGS. 3-4 can be initiated, as indicated at block 302. As illustrated next at block 304, a memory color can be selected from a user interface. Next, the operation depicted at block 312 involves the use of a printer model and/or other output mechanism, including related algorithms and software, to determine which separation is located at the boundary. For example, for L*a*b*=[100, 50, 50], cyan is located at the boundary, wherein cyan=0. Following processing of the operation depicted at block 312, nominal CMY values can be determined, as indicated at block 314. For example, when cyan is at the boundary, nominal CMY values can be obtained only for MY, and C can be set equivalent to the boundary value.

Thereafter, as illustrated at block 316, a Jacobian matrix can be determined at the nominal CMY values utilizing the printer model described earlier with respect to block 312. This Jacobian matrix involves the derivatives of C and D in the NCD orthogonal space with respect to the appropriate axes in CMY space. For example, in the cyan=0 example considered above, the derivatives would be taken with respect to the magenta and yellow axes.

Performing this calculation requires the specification of the T transformation, which can be obtained as indicated at blocks 306 and 308. As depicted at block 306, an operation is performed in which the NCD orthogonal vector space is searched for the desired memory color and desired gamut mapping strategy.

Thereafter, as indicated at block 308, a transformation T can be determined by inverting a biased L*a*b* to an NCD transform. An example of the operation depicted at block 308 is mathematically provided by equation (4) indicated above. Next, as indicated at block 318, the gain matrix can be determined utilizing the Jacobian matrix calculated earlier. This also requires the T matrix calculated as depicted at block 308.

The gain matrix information via the operation indicated at block 318 and the nominal CMY values as depicted at block 314 are next fed to block 328 on FIG. 4 through continuation block "A" (block 326). Block 328 is part of an iteration loop that also includes blocks 330, 332, 334, 323 (continuation block "D"), 310, 322, and 326 (continuation block "A").

The operation described at block 328 generally involves processing the error vector calculated via the operation indicated at block 310 in a feedback controller that utilizes the gain matrix and nominal CMY values to obtain new CMY values. In the first pass through the iteration loop, however, no error has yet been calculated. In this case, block 328 just passes the nominal CMY values on to block 330, which produces and prints an image containing test patches. Next, as depicted at block 332, L*a*b* values from the test patches can be measured using, for example, a spectrophotometer.

As indicated at block 334, these L*a*b* vectors can be transformed to NCD coordinates utilizing the T transformation matrix, obtained from block 308 through continuation block 320 ("C"). The L*a*b* values obtained the operation illustrated at block 332, and the CMY values as indicated at block 328 can also be stored, as depicted at block 336. When the iterative process has reduced the error to a satisfactory level (the output of comparison block 322 is "yes"), block 322 sends a signal to block 336 through continuation block 324 ("B") to "write out" the CMY and L*a*b* data in a suitable format. Customer images can also be appropriately modified at this time. The process then terminates, as indicated at block 338.

If the process does not terminate, the new NCD values are sent to block 310 through continuation block 320 (i.e. "D"). Block 310 compares the C & D values with the desired C & D values and calculates an error vector. The desired C and D values are usually 0, but more generally could be a function of the NCD orthogonal vector space determined in block 306.

As indicated in block 322, the error calculated in block 310 can be compared to the limit. If the error is above the limit, the error vector can be fed to block 328 through continuation block 326 ("A"), where it can be processed in the feedback controller. An example of a feedback controller that may be utilized in this manner is the iterative controller 210 described earlier with respect to FIG. 2. Thereafter, the CMY values generated by this controller are processed by the rest of the iteration loop (blocks 330, 332, 334, 323, 310, 322, and 336, as was previously described. If the error is below the limit, a signal can be sent to block 336 through continuation block 324 ("B"), as was previously described, to terminate the process.

In an alternative embodiment of the present invention, the operations depicted at blocks 312 and 314 can be processed in association with the operation depicted at block 328. In other words, the operations of block 312 and 314 can be processed within a feedback controller. For such implementations, the gain matrix for each memory color generally contains 3×3 elements. The selection of appropriate elements can be established within the feedback controller, dependent upon which CMY values reach the boundary.

It can be appreciated from the foregoing that embodiments of the present invention can be implemented in the context of modules. In the computer programming arts, a module can be typically implemented as a collection of routines and data structures that performs particular tasks or implements a particular abstract data type.

Modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

The logical operations depicted in FIGS. 3-4 can be implemented as a module or a group of modules in association with hardware devices, such as a printer or other data rendering device. Transformation modules 204 and 224 and controller 210 of FIG. 2 can also be implemented as individual modules or groups of modules. Controller 210 can thus be configured as a controller module for assisting in implementation of the control feedback loop depicted in FIG. 2. Adder 208 may also be implemented as an adder module for adding feedback obtained through transformation module 224 and the output of transformation module 204.

Figure 5:
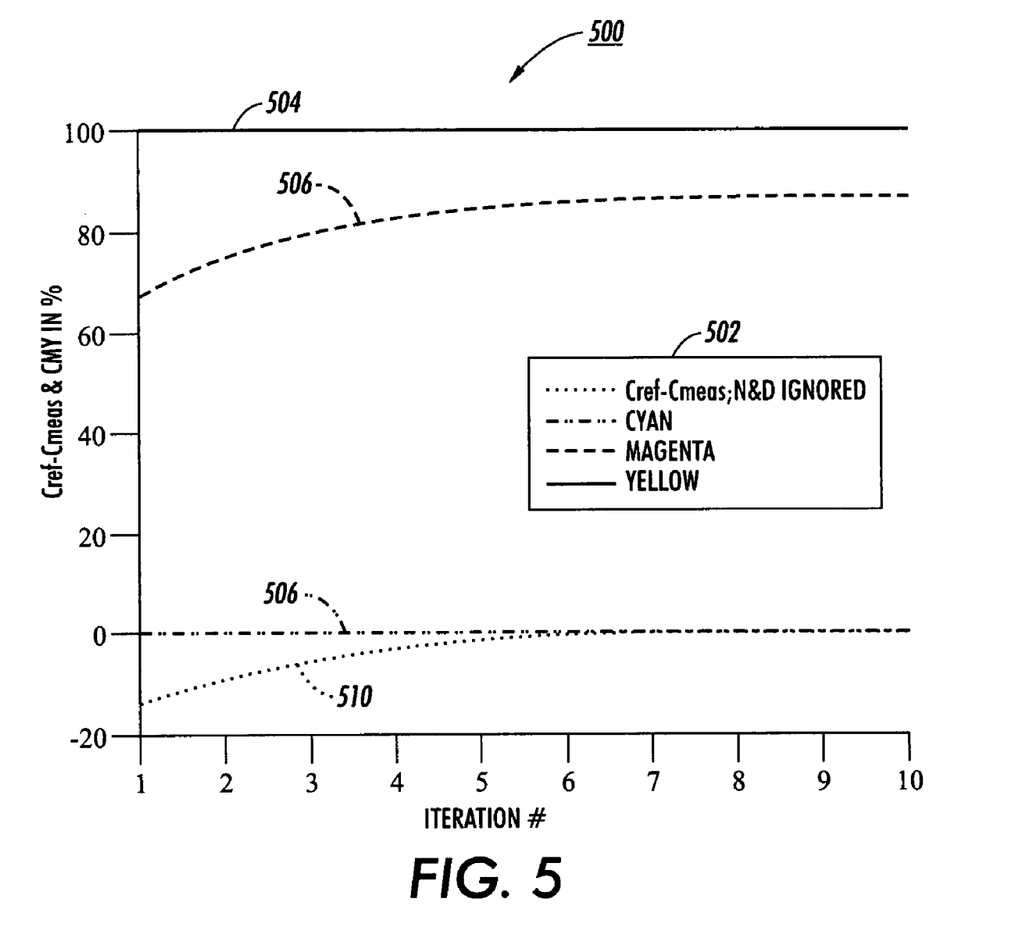
FIG. 5 illustrates a graph illustrating control simulation results for memory color, in accordance with an embodiment of the present invention.

FIG. 5 illustrates a graph 500 illustrating control simulation results for memory color, in accordance with an embodiment of the present invention. Graph 500 represents one example of control simulations that can be carried out according to an embodiment. Graph 500 includes a legend box 502, which indicates yellow, magenta, cyan and cref-cmeas (N&D ignored) colors. The desired color lies along the edge of the gamut between yellow and red, so only one coordinate in NCD space need be considered. Line 504 represents a yellow plot, while line 506 represents a magenta plot. Additionally, line 508 represents a cyan plot and line 510 indicates a plot of Cref-cmeas. "Cref" refers generally to the C coordinate of the NCD vector, while "cmeas" can be defined as the C measured coordinate that results after processing by a transformation or transformation module, such as the transformation module 224 depicted in FIG. 2

Graph 500 thus generally illustrates convergence plots, wherein cyan and yellow are limited to 0 and 100% respectively. In graph 500, only magenta is variable. A final steady state value for magenta, according to graph 5900, is approximately, 86.7%. Thus the gamut mapped CMY values in percent are [0 86.7 100]. Corresponding gamut mapped L*a*b* values are given by [60.33 55.85 55.85] as indicated in equation (5) below:

$$\begin{bmatrix} L^* \\ a^* \\ b^* \end{bmatrix}_{gamut\ mapped} = \begin{bmatrix} 1 & 0 & 2 \\ 1 & -1 & -1 \\ 1 & 1 & 1 \end{bmatrix} \begin{bmatrix} N \\ C \\ D \end{bmatrix}_{measured} \quad (5)$$

$$= \begin{bmatrix} \begin{bmatrix} 1 & 0 & 2 \\ 1 & -1 & -1 \\ 1 & 1 & 1 \end{bmatrix} \begin{bmatrix} 57.34 \\ 0.0 \\ 1.492 \end{bmatrix} \end{bmatrix}$$

$$= \begin{bmatrix} 60.33 \\ 55.85 \\ 55.85 \end{bmatrix}$$

Based on the foregoing it can therefore be appreciated that when the consistency of desired memory color is required, an appropriate user interface can be utilized to produce desired L*a*b* values for a memory color control system. Because the memory color control system possesses an inverse characterization table (e.g., L*a*b* to CMY/CMYK), a correct strategy for gamut mapping in association with the desired L*a*b* values can be utilized to obtain three colorant CMY (i.e., cyan, magenta, yellow) coordinates.

If a patch with CMY values is printed and the color measured utilizing a spectrophotometer, the resulting measured L*a*b* value may not correspond to the desired L*a*b* value. Such a discrepancy may result from two possible reasons: (1) gamut mapping of colors to the gamut surface, and/or (2) variations in the engine caused by associated media and processes. Regarding reason (1), gamut mapping of colors to the gamut surface is necessitated primarily by device physics, and can be accomplished by a number of techniques known in the art. After the gamut-mapping step, a comparison of measured colors is generally performed with gamut-mapped L*a*b* values within a memory color control module.

To address reason (2), stable control of the gamut-mapped colors with respect to engine variations is accomplished via the aforementioned order reduction, which converts a three-dimensional control problem to a two- or a one-dimensional control problem. This utilizes a separate algorithm to produce the correct amount of CMY values so that when the patches are printed with those particular CMY values and measured with a spectrophotometer, colors can correspond to the desired L*a*b* after gamut-mapping.

The order reduction can be accomplished by selecting and eliminating appropriate colors at the gamut surface. For example, consider an out of gamut red. Generating such a color would require a negative amount of cyan. Because this action is physically impossible, such a color is out of the printer's gamut. To find the gamut mapped color, it may be necessary to set C=0, and vary M and Y to obtain the "best" gamut mapped red. Varying M and Y can be accomplished within an iterative controller as described herein.

It is appreciated that a variety of spectrophotometers can be implemented in accordance with embodiments of the present invention. One example of such a spectrophotometer is disclosed in U.S. Pat. No. 6,567,170, "Simultaneous Plural Colors Analysis Spectrophotometer," which issued to Tandon, et al on May 20, 2003. U.S. Pat. No. 6,567,170 is assigned to Xerox Corporation and is incorporated herein by reference.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method, in which steps are executed by an image processing device, comprising:
   selecting a memory color from a user interface;
   automatically providing a plurality of color values as input to an image processing device, wherein said image processing device is under a control of a particular dimensional order;
   dynamically determining which color value among said plurality of color values has attained a gamut limit;
   producing a Jacobian matrix associated with said color that has attained said gamut limit according to said color's nominal CMY values;
   deriving a transformation matrix; producing a gain matrix using said Jacobian matrix transforming said particular dimensional order of said color which was determined to have attained said gamut limit using said transformation matrix, and said gain matrix, in response to dynamically determining which color value among said plurality of color values has attained gamut limit; and
   thereafter automatically reducing said particular dimensional order through use of a dedicated gamut mapping function utilized to determine surface points and axes, thereby allowing for an improved estimate of said color based on said reduced dimensional order, thereby providing improved control for colors that are located external to said gamut and maintaining said color's hue.

2. The method of claim 1 wherein a color sensor is used in dynamically determining which color value among said plurality of color values has attained a gamut limit.

3. The method of claim 1 wherein said particular dimensional order comprises a three-dimensional order represented by the colors cyan, magenta, and yellow.

4. The method of claim 3 wherein reducing said particular dimensional order, further comprises:
   reducing said three-dimensional order to a two-dimensional order.

5. The method of claim 3 wherein reducing said particular dimensional order, further comprises:
   reducing said three-dimensional order to a one-dimensional order.

6. The method of claim 1 wherein a ray-based approach consisting of a ray being drawn from a desired color to a point on a neutral axis through said gamut limit is used to perform said gamut mapping.

7. The method of claim 6 wherein said color sensor comprises an offline sensor.

8. The method of claim 6 wherein said color sensor comprises an inline sensor.

9. A system, comprising:
   a first transformation module wherein said first transformation module receives input of a desired L*a*b* memory color value and outputs a desired NCD memory color value; and
   a feed back control loop comprising:
      an image processing device for producing a compensated CMY printed value corresponding to said desired NCD memory color value, wherein said image processing device is under a control of a particular dimensional order;
      a color sensor for measuring said compensated CMY printed value and outputting a corresponding measured L*a*b value, thereby dynamically determining which color value among said plurality of color values has attained a gamut limit;
      an iterative controller for reducing error associated with said desired NCD memory color by comparing said measured NCD value against said desired NCD memory color value, converting said measured NCD value to said compensated CMY printed value, and providing said compensated CMY printed value to said image processing device;

a second transformation module for inputting said measured L*a*b* value from said color sensor and outputting a measured NCD value corresponding to said measured L*a*b* value thereby automatically reducing said particular dimensional order based on determining which color value among said plurality of color values has attained said gamut limit; and an adder module for adding feedback obtained through said second transformation module as input to said iterative controller, thereby completing an iterative process for providing improved control for colors that are located external to said gamut;

wherein an output of said feed back control loop provides a minimal error between said L*a*b* memory color and said measured L*a*b* color value thereby providing improved control of out of gamut memory colors.

10. The system of claim 9 wherein said second transformation module further comprises a transformation module for transforming said particular dimensional order, in response to dynamically determining which color value among said plurality of color values has attained gamut limit.

11. The system of claim 9 wherein said particular dimensional order comprises a three-dimensional order.

12. The system of claim 11 wherein said second transformation module further comprises a compensation module for reducing said three-dimensional order to a two-dimensional order using a standard International Color Consortium (ICC) framework.

13. The system of claim 12 wherein said compensation module reduces said three-dimensional order to said two-dimensional order in response to determining which colors among said plurality of colors have attained said gamut limit.

14. The system of claim 11 wherein said second transformation module further comprises a transformation module for reducing said three-dimensional order to a one-dimensional order.

15. The system of claim 14 wherein said second transformation module reduces said three-dimensional order to said one-dimensional order in response to determining which color among said plurality of colors has attained said gamut limit.

16. The system of claim 9 wherein said color sensor comprises an offline sensor.

17. The system of claim 9 wherein said color sensor comprises an inline sensor.

18. The system of claim 9 further comprising a color rendering device associated with said second transformation module and wherein said second transformation module is integrated with said image processing device.

19. The system of claim 9 wherein said iterative controller's iterative output is input to said color rendering device, such that said iterative output of said iterative controller reflects a plurality of compensated color values requiring correction for rendering variations thereof.

20. The system of claim 17 wherein said color rendering device comprises a printer.

21. The system of claim 17 wherein said color rendering device comprise a photocopy machine.

22. A method, in which steps are executed by an image processing device, comprising:

selecting a memory color from a user interface automatically providing a plurality of desired L*a*b* memory color values as input to a transformation module;

transforming said L*a*b* memory color values into NDC memory color values using a transformation function;

providing said NCD memory color values to an adder;

providing the output from said adder as input to an iterative controller which outputs compensated CMY color values;

providing said compensated CMY color values as input to a graphical rendering device;

printing patches of said compensated CMY color values; providing said patches as input to a color sensor; generating measured L*a*b* values for said patches; providing said measured L*a*b* values as input to a second transformation module which transforms said L*a*b* values into NCD values and provides said NCD values to said adder, thereby completing a feedback loop which minimizes the error between the measured color and the desired L*a*b* memory color providing improved control for colors that are located external to said gamut.

* * * * *